Figure 1:
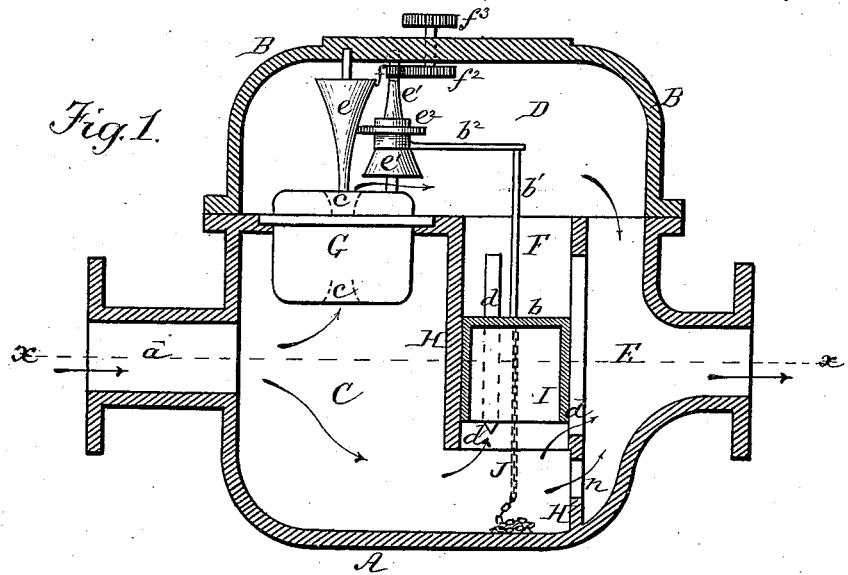

(No Model.)

L. H. NASH.
METHOD OF OPERATING PROPORTIONAL WATER METERS.

No. 332,936. Patented Dec. 22, 1885.

Attest:
C. E. Grant
F. O. Morris

Inventor:
Lewis Hallock Nash
by his Attorneys
Johnson & Johnson

UNITED STATES PATENT OFFICE.

LEWIS HALLOCK NASH, OF BROOKLYN, ASSIGNOR TO THE NATIONAL METER COMPANY, OF NEW YORK, N. Y.

METHOD OF OPERATING PROPORTIONAL WATER-METERS.

SPECIFICATION forming part of Letters Patent No. 332,936, dated December 22, 1885.

Application filed April 22, 1885. Serial No. 163,052. (No model.)

*To all whom it may concern:*

Be it known that I, LEWIS HALLOCK NASH, a citizen of the United States, residing at Brooklyn, in the county of Kings and State of New York, have invented new and useful Improvements in Methods of Operating Proportional Water - Meters, of which the following is a specification.

The invention herein relates to devices for measuring water flowing through a pipe in which the volume is divided at the inlet into two streams, one of which only, passing through the chamber containing the working and registering mechanism, is in such determined relation to the other stream as to represent a given and definite proportion of the entire volume, and the indication so made should be the measurement of the whole passing volume.

In other applications for patents filed by me I have described and claimed a method and means for equalizing the pressures in the receiving and discharging chambers by controlling the inflow by any difference of the pressure in the separate chambers, and thereby balance the resistance to the flow through the working-chamber of the indicating device, to the end that a proper and accurate registration may be made of the measurement of only a part of the flowing volume to give the sum total of the entire volume. This equalization of the pressure to balance the flow and delivery of the separate streams is effected by means of a partition forming said chambers capable of yielding under pressure, and by its movement under such unequal pressure control the supply-ports to one of said chambers independent of the indicating mechanism.

The principle of action involved in my said application is equalizing the pressure of each separate stream at its outlet-orifice by means of any variation which may exist in the pressure in the streams at their outlet-orifices, employing for this purpose orifices of a given size, and a valve controlled by a movable partition actuated only by such variations of pressure in the chambers formed thereby and having such given orifices.

My present improvement consists of a new method of effecting a proportional measurement of a volume divided into separate streams, whereby great or small capacity of supply is obtained with accuracy of measurement. In this new method the difference between the pressure of the water in the main receiving-chamber and in the discharge-passage is utilized to vary the speed of an indicating mechanism, connected with the indicating device, proportionately to the quantity of water passing in the divided volume, and to indicate the quantity of water passing in the main passage. As a means for carrying out this new method I employ a piston-valve in such manner as to control the quantity of the outflow of the main stream, so that the pressure thereof will open or close the discharge-orifices according to such pressure at the point of outlet, and thus control the quantity of the water passing from the main passage. The movement of the piston-valve is communicated to the indicating mechanism by suitable integrating mechanism, so that the greater the discharge of water through the main passage the faster the indicating mechanism of the device will be moved, and thus be caused to show the quantity of the volume of the water passing in the main stream, while the quantity passing in the metered stream is also indicated. In this action of the piston-valve it will open the outlet of the main stream, so that there will be a free passage for the water under large rates of flow; but when the flow is smaller this passage will be closed to such extent as to cause a greater proportion of the water to pass through the metered passage, the proportional measurement and indication of the whole passing volume being the same in either case. So far as I know and can find prior to my said inventions such division and proportionate regulation of the separate currents has been effected by valves operated so as to control the area of the inlet-orifices of the separate passages to the proportionate quantity of water passing through them, and the force used to regulate the area of the inlet-orifices is the whole of the moving stream entering the inlet-passage. The accomplishment of this result is not sufficient to effect and determine a proper measurement of the water passing through two chambers of entirely different construction and character without provision for equalizing the pressure in both streams in their separate passages, or of controlling the indicating device under the unequal pressures of the separate streams in such manner as to indicate the quantity passing in the separate streams. The method embraced in this latter proposition constitutes the subject-matter of my present invention, and in the accompanying drawings I have illustrated means in an organized proportional water-meter for carrying out this method.

Figure 3:
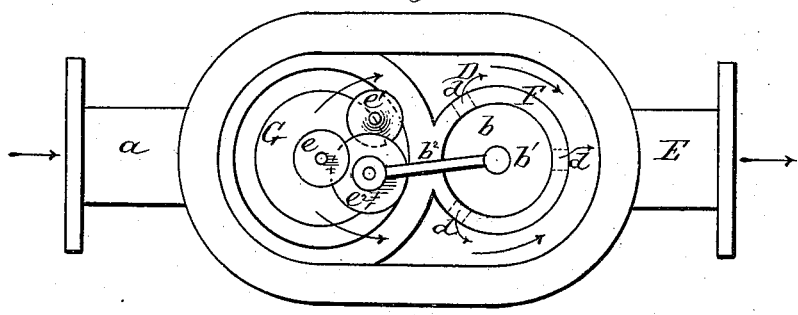
Figure 2:
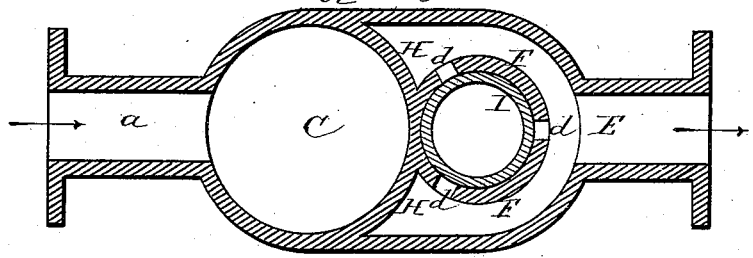

Referring to these drawings, Figure 1 represents a vertical section of a proportional water-meter, showing the indicating device in elevation, and the connection of the piston-valve with variable speed-indicating mechanism operated by said piston-valve, whereby provision is made for indicating the measurement of the quantity passing in each separate stream. Fig. 2 represents a top view, the cover of the shell being removed to show the disposition of the differential cone-pulleys, which, in connection with the piston-valve, effects the indication of the volume of the water passing in the main chamber. Fig. 3 represents a horizontal section taken on the line $x\ x$ of Fig. 1.

I will designate that division of the stream flowing through the metered passage the "positive-measured" and the other the "main" current, and as the flow and pressure of the former current is obstructed by and measured by the indicating operating mechanism, so does my invention provide means operated by the flow and pressure of the latter or main current for measuring and indicating its flow to complete the indication of the whole volume.

My improved proportional measuring device is not confined in its application to any particular construction of devices for operating the indicating mechanism, which is arranged in what is known as the "meter," the inclosing-case G of which I have shown in elevation as arranged within the shell of the main chamber C; but it may be otherwise arranged, so that a portion of the water passes therefrom through said meter-working parts into the chamber D. The shell A is divided into a receiving-chamber, C, and a discharging-chamber, E, by a partition, H, upon which is formed a cylinder, F, open at both ends, the chamber D being formed over the upper open end of the cylinder by the cover B, so as to open into the discharge-chamber. The meter-case G hangs within the main chamber C, between its inlet and the said cylinder, from a top plate, which forms a continuation of the partition, and the meter-case is entirely inclosed, so that a portion of the water passes direct through said meter-case from chamber C into chamber D, and thence into the outlet E, to the service-pipe. The other portion of the water passes through the chamber C, beneath the open end of the cylinder, through ports $d$ $n$ therein, and in the partition into the discharge-chamber E, the course of the separate currents being indicated by the arrows in Fig. 1. A piston-valve, I, is fitted to move freely within the open-ended cylinder, so as to open or to close the cylinder-ports. It is preferably of cup shape, placed with its open end downward, so the water flowing through the chamber C will act by pressure upon the closed end $b$ of the piston-valve in a manner to cause it to rise and allow it to fall, (more or less,) and thus regulate the quantity of the water passing through said chamber, by controlling the area of the outlet-ports $d$, which are formed by vertical slots in the wall of the cylinder.

For the purpose of utilizing this movement of the piston-valve as a co-operating means for effecting an indication of that portion of the water flowing through the chamber C, I provide means for connecting said piston-valve with the indicating mechanism. In the drawings such connections are illustrated as consisting of a rod, $b'$, rising centrally from the closed end of the piston-valve, and a horizontal branch arm, $b^2$, extending from the rod $b$, carrying a friction-wheel, $e^2$, in horizontal position for co-operation with the indicating devices operated by the working parts of the meter. The working parts of the meter are properly connected with and drive a drum or cone, $e$, rising from the meter-case and supported by a bearing in the cover B, while a second drum or cone, $e'$, is supported in bearings in the meter case and cover B, the positions of the cones being in reverse relation, so as to form with the friction-wheel part of a system of variable speed gearing in which both cones are driven by the friction-wheel. The cone $e'$ has a pinion, $f$, at its upper end, which gears with and drives a pinion, $f^2$, which connects through the top of the cover B with the pinion $f^3$, to which is connected the dial mechanism, which completes the indicating mechanism and indicates the measurement of the flow of water.

In the operation of this variable speed-gearing the motion of the meter-working parts caused by the water running through it is communicated to the cone $e$ and by the friction-wheel $e^2$ to the second cone, $e'$; hence if the connecting friction-wheel $e^2$ is at the lower end of the cones the small part of the cone $e$ will be driving the large part of the cone $e'$, and therefore the movement of the gear $f^3$ and of the indicating mechanism will be slow, which will be the conditions when the cylinder-ports $d$ are almost closed by the valve-piston. In such case the greater part of the water will pass through the meter-working parts; but when the flow is greater so as to raise the piston-valve to its highest position the friction-wheel $e^2$ will bear upon the large part of the cone $e$ and on the small part of the cone $e'$, and hence the latter will have a much greater velocity and the indicating mechanism will work faster, which will be the condition when the cylinder-ports $d$ are open to a much greater extent, and the greater part of the water will pass through the main chamber. As the piston-valve moves upward to its highest point I provide a counteracting influence, so that it will require an increase of the pressure to raise it. This provision weights the piston-valve and consists of a chain, J, which is suspended from the closed end of the piston-valve and coils upon the bottom of the chamber C, so that the higher the piston-valve moves the greater will be the weight of the chain that will be supported by it, and hence the greater pressure of water required in chamber C to sustain its weight and the greater the quantity of water that will flow through the port-openings.

The diameters and form of the cones will be determined by actual test in such a manner that the movement of the indicating mechanism will be always proportional to the total amount of the water passing through the two channels c and C.

In the drawings I have shown the ports d d as being directly controlled by the piston-valve, and an independent port, n, as being always open. In meters used for a very small flow of water it is best to dispense with the port n, so that as the pressure grows less the piston-valve may close all the outlets to the main chamber, and thus cause all the water to flow through the metered passage; but when it is desired to pass large quantities of water the port n may be used either in connection with the cylinder-ports d, or these latter ports may be omitted, and since the piston-valve is operated by the pressure of the water in the chamber C, its operation will be controlled in proportion to the flow of the water through the orifice n.

The form and proportions of the variable speed-indicating mechanism being first determined for each case, then while the conditions are not changed the action of the device will be constant in its measurement by the meter-working parts, in its measurement of the remainder of the current which acts upon a piston-valve whose function is like that of a pressure-gage, and in its measurement of the entire volume flowing as a single stream.

The device herein described, and shown in the drawings, in its organization, parts, and entirety as one operative mechanical structure for carrying out practically the method of measuring divided streams as a unit, or the flow of a single stream, is not claimed herein, as such matter forms the subject of a separate application for a patent filed by me of even date herewith.

I claim—

1. The improved method herein described of measuring water flowing through a pipe and indicating the quantity of such flow, which consists in dividing the flowing volume into two streams, causing one stream to pass through a metered passage and utilizing the difference of pressure in the two streams passing through their separate chambers to vary the speed of an indicating mechanism, whereby the indicator is caused to indicate the quantity of water passing in the two streams.

2. The method, substantially hereinbefore described, of measuring water flowing in separate streams from a single supply-pipe, which consists in utilizing the difference in the pressure in the two streams in their separate courses to vary the speed of an indicating mechanism conjointly with the indicating device, whereby the proportionate quantity passing in both streams is determined.

3. The method, substantially hereinbefore described, of measuring water flowing in separate streams from a single supply-pipe through separate chambers, which consists in controlling the outflow of one stream, so that its pressure will operate a discharge-controlling valve to govern the area of the discharging-ports from said chamber, and causing the other stream to pass from a metered passage on the opposite side of said pressure-controlled valve, substantially as described, for the purpose specified.

4. The method, substantially hereinbefore set forth, of measuring water flowing in separate streams from a supply-pipe through separate chambers, which consists in utilizing the difference of pressure in both streams in their separate chambers, to alter the speed of the indicating mechanism, to indicate the quantity passing in the separate streams as the sum total of the entire passing volume.

5. The method, substantially hereinbefore set forth, of measuring water flowing through separate chambers, which consists in altering the speed of the indicating mechanism by means of the difference of the pressure of the two streams caused to act upon a movable dividing medium of said chambers having direct connection with said mechanism.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.